Figure 1:
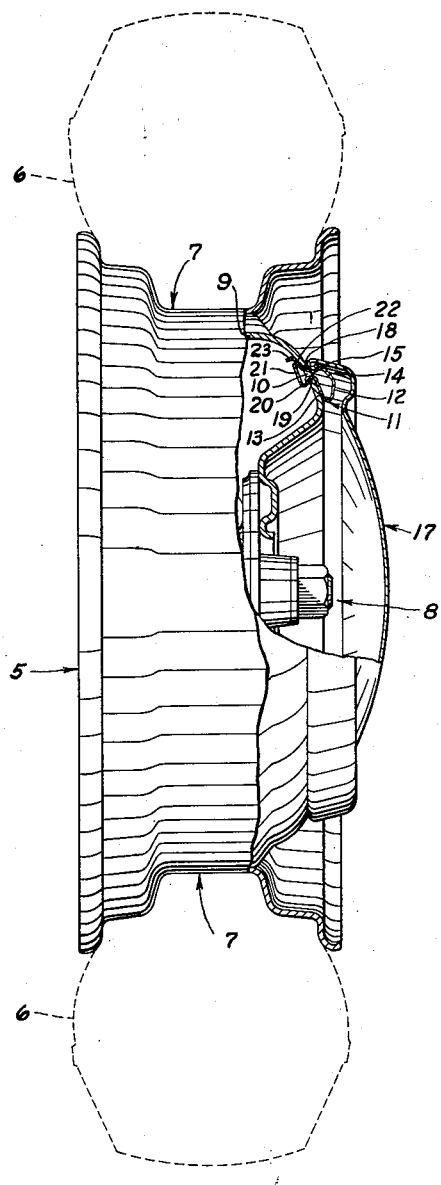

Aug. 5, 1952     C. O. SLEMMONS     2,605,530
RESILIENT CLIP FOR RETAINING HUBCAPS TO WHEELS
Filed July 5, 1949

INVENTOR.
Charles O. Slemmons
BY Brown, Jackson, Boettcher & Dienner
ATTORNEYS.

Patented Aug. 5, 1952

2,605,530

UNITED STATES PATENT OFFICE 2,605,530

RESILIENT CLIP FOR RETAINING HUBCAPS TO WHEELS

Charles O. Slemmons, South Bend, Ind., assignor to The Studebaker Corporation, South Bend, Ind., a corporation of Delaware Application July 5, 1949, Serial No. 103,025

1 Claim. (Cl. 24—259)

My invention relates to spring metal clip bands for retaining hub caps to the wheels of motor vehicles or the like.

Heretofore, it has been the practice for retaining hub caps to vehicle wheels to rivet a plurality of spring metal clip bands in spaced relation adjacent the circumference of the discs of the wheels with the forward projecting ends of the clips being adapted to engage with the circumferential bead portions associated with the hub caps. Since clips of this type necessitate the employment of rivets and rivet hammers considerable expense and trouble is connected with their use. Another disadvantage of clips of this character is that when a clip breaks, the rivet securing the clip to the disc of the wheel must be removed, as by a small punch and hammer, before a new clip may be substituted and the new clip must be either riveted or bolted to the wheel disc which requires the removal of the wheel and tire from the hub.

It is an object of my invention to provide a spring metal clip for retaining a hub cap to the mounting flange of a wheel of a character that is adapted to be self securing to the disc of the wheel.

It is another object of my invention to provide a spring metal clip, of the character noted, which is adapted to be disposed in an opening formed in the wheel disc without the employment of tools.

It is a further object of my invention to provide a clip, of the character noted, that is adapted to be easily removed from a wheel disc, without the employment of any special tools other than a conventional screw driver, if a portion of the clip should crack or break while in service.

It is a still further object of my invention to provide a clip that is adapted to be disposed in an opening formed in a wheel disc, without the employment of tools, as a replacement for a broken or old clip which has previously been removed from the opening.

It is a still further object of my invention to provide a clip, of the character noted, which is adapted to reduce to a minimum the axial thrust that is required to secure a hub cap to the disc of a wheel flange.

It is a still further object of my invention to provide a clip, of the character noted, that is adapted to resist the accidental release of a hub cap due to thrust applied substantially radially as for example by road shock, to the hub cap while it is secured to a wheel.

Now, in order to acquaint those skilled in the art with the manner of constructing and using a spring metal clip of my present invention, I shall describe in connection with the accompanying drawings a preferred embodiment of my invention.

Figure 2:
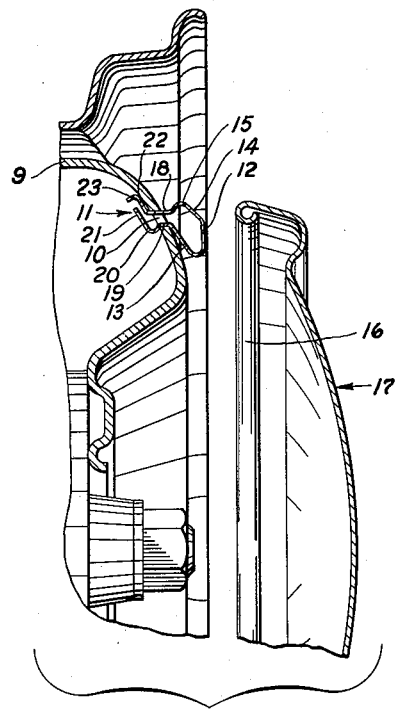
Figure 3:
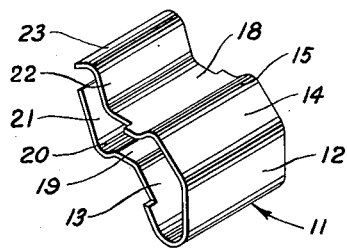

In the drawing:

Figure 1 is an elevational view of a conventional vehicle wheel with the tire thereon shown in dotted outline, a hub cap in assembled position in which a portion of the wheel and hub cap is broken away and shown in section, and showing in section the spring metal clip of my invention under compression for retaining the circumferential bead of the hub cap in assembled position on the disc portion of the wheel;

Figure 2 is an enlarged view of the broken away portion of the wheel of Figure 1 with the hub cap disassembled and in juxtaposition of the wheel, and with the clip of my invention in its assembled position on the wheel; and Figure 3 is an enlarged perspective view of the spring metal clip of my invention.

Referring to Figure 1, there is shown a wheel 5 having a tire 6 illustrated in dotted outline, mounted in the conventional manner on the rim 7 of the wheel 5. The wheel 5 is mounted at the end of an axle by known conventional means indicated generally at 8.

The wheel 5 comprises an outer disc or flange portion 9 which has formed in spaced circumferential relation a plurality of substantially rectangular openings or slots 10 of which only one is shown, which are each adapted to receive the outer free end portions or forward ends of a spring metal clip 11 of my invention.

Referring now to Figure 3, it will be seen that the clip 11 of my invention is formed from a substantially rectangular strip of spring metal, folded reentrantly intermediate its ends to form an external portion distinguished by a curvilinear closed bottom end defined by a curved bight portion 12 having a pair of substantially parallel inner and outer spring arm portions 13 and 14, respectively, extending obliquely and inwardly therefrom. The upper end of arm 14 is formed with an inwardly extending rounded shoulder portion 15 which forms an acute angle with the outer arm 14 and as will later appear in greater detail is adapted to engage the inside of the circumferential bead 16 of a hub cap, indicated generally by the reference numeral 17. Extending inwardly of the shoulder portion 15 and the inner arm portion 13 are a pair of substantially parallel outer and inner leg portions 18 and 19, respectively, which are adapted to engage the inner edges of a rectangular slot 10 formed in the wheel flange 9. The two legs are bent in an obtuse angular relation with respect to the arms 13 and 14. At the upper end of the leg portion 19 is formed a reentrantly rounded inner shoulder portion 20. Extending upwardly and obliquely from the shoulder portion 20 and the leg portion 18 are a pair of parallel inner and outer finger portions 21 and 22, respectively. The outer or free end of the finger 22 is rolled inwardly to define a planar flange portion 23 which is formed substantially at right angles with finger 22 and adapted to act as a stop means for the free or outer end of the finger 21, by virtue of its overhanging relation therewith, when the clip 11 is placed in compression by mounting of a hub cap thereon as shown in Figure 1.

The external portion of clip 11 extending from the central part of the leg portion 18 to the central part of the arm portion 13 including the shoulder portion 15, the arm portion 14, and the bight portion 12 has its edges projecting laterally beyond the edges of the remaining or internal portion of the clip 11, as shown in Figure 3 so that the narrowed internal portion thereof will register with the slotted opening in the wheel disc and the wider external portion of the clip will abut the outer surface of the disc to locate the clip properly.

The clip 11 is adapted to be assembled to the wheel flange 9 by compressing the sides of the clip 11 and inserting the internal portion thereof defined, as noted, by the finger portions or free ends 21 and 22 and shoulder portion 20 through the opening formed in the wheel flange 9. The clip is then released allowing the sides to spring outwardly with the outwardly facing sides of leg portions 18 and 19 making contact with the inner edges of the opening 10. The external portion of the clip 11 extending laterally beyond the edges of the narrower internal portion of the clip acts to limit the distance to which the clip 11 may be inserted into the opening 10 of the wheel disc or flange 9 thereby serving as a locating means. The clip 11 in the position just described is shown in Figure 2. It will also be noted that the obliquely extending outer arm portion 14 of the clip 11 serves as a cam surface lying in an inclined plane along which the bead 16 of the hub cap 17 is adapted to slide when the hub cap 17 is being placed by axial movement thereof into position abutting the wheel disc or flange 9. The surface 14 materially reduces the axial thrust required to mount the hub cap to the wheel.

When hub cap 17 is assembled on the wheel 5 the bead 16 of the hub cap 17 is adapted to seat between the disc or flange 9 and the rounded shoulder portions 15 of each of the plurality of clips 11. The hub cap 17 in the position described is shown in Figure 1. The bead portion 16 exerts inward radial pressure on the outer shoulder portion 15 which puts the clip under compression so that it retains the hub cap 17 to the wheel 5. When the clip is fully compressed, the free end of finger 21 abuts against the flange 23 at the free end of finger 22, thus acting to keep the finger 22 from being pulled through the opening 10 when the bead 16 of the hub cap 17 engages the shoulder portion 15 of the clip 11. The contact of finger 21 with stop flange 23 reduces the tendency of the internal portion of the clip 11 extending inside of the opening 10 from deforming to a shape other than the shape above described to give the clip additional rigidity against further deformation. By virtue of this construction the application, for example, of thrust applied substantially radially as may be caused by the hub cap striking a curb or by a shock load caused by the wheel striking a road obstruction such as a hole in the road surface, does not dislodge the hub cap from the clips, but in effect actually increases the spring rate of the clips so as to retain securely the hub in assembled position; this by virtue of the upper end of finger 22 coming into abutment with the stop flange 23. It will be seen then, the clip of my present invention will substantially eliminate the accidental release of hub caps due to radial blows applied thereto. The shoulder portion 20 is provided to keep the finger 21 from being pulled through the opening 10 when the bead 16 of the hub cap 17 engages the shoulder portion 15 of the clip 11.

The clip 11 may be easily removed from the opening 10 formed in the wheel flange 9 by simply disposing the blade of a screw driver, or similar tool, between the arm portion 13 of the clip 11 and the adjacent part of the wheel flange 9 and maneuvering the same, in such a manner as to retract the shoulder portion 20 and the fingers 21 and 22 from the opening 10.

It will be noted that the spring metal clip bands 11 may be initially secured to the wheel flange 9 without the use of tools and if the clips become cracked or broken while in service, the remaining portions may be easily removed as with the aid of a screw driver and replacement clips substituted therefor, without the use of tools and without removing the wheel from the hub.

While I have shown what I consider to be a preferred embodiment of my invention, it will be understood that various modifications may be made therein without departing from the spirit and scope of my invention.

I claim:

A detachable spring metal clip insertable in a rectangular slotted opening formed in a disc portion of a wheel for detachably mounting an outwardly concaved hub cap, having a beaded perimeter, to the wheel disc, comprising, a substantially rectangular strip of spring metal folded reentrantly back on itself to define inner and outer clip portions, said inner portion lying adjacent said disc when said clip is mounted thereto, and to provide a curvilinear bottom end bight portion for said clip; a pair of planar, substantially parallel, spaced inner and outer arm members comprising contiguous, oblique and inwardly directed continuations of said curved bottom end portion; an inwardly directed outer shoulder portion defining and formed at the upper reaches of said outer arm member, said outer shoulder defining a substantially planar surface which lies in acute angular disposition with respect to said outer arm so that when said clip is mounted on said disc said shoulder provides a gripping sloped surface adapted to lie inside and behind said hub cap's beaded perimeter; a pair of inner and outer parallel, spaced leg portions comprising, respectively, planar continuations of said inner arm and outer shoulder, each of said legs lying in obtuse angular relation with respect to said arms and being directed inwardly therefrom, an inner shoulder defining the planar inward reaches of said inner leg and formed with a reentrant bend to dispose said inner shoulder radially inward of said inner leg when said clip is mounted to said disc, said inner shoulder being adapted to grip the inner surface of said disc adjacent said opening therein for purposes of holding said clip to said disc; a pair of inner and outer parallel, spaced fingers comprising, respectively, upper continuations of said inner shoulder and said outer leg, said fingers lying in substantially parallel inwardly offset relation with respect to said two arms and said inner finger having an upper free end which comprises the free end of said clip's inner portion; and an outwardly directed planar flange member formed at the upper end of said outer finger so as to lie in right angular disposition therewith to overhang said inner finger's free end whereby said clip is formed as a substantially open loop adapted resiliently to contract and close in response to externally imposed thrust, said clip in its closed condition having the upper free end of said inner finger in abutting engagement with said overhanging flange thereby to limit and prevent further closure of said loop and provide a substantially rigid structure.

CHARLES O. SLEMMONS.

REFERENCES CITED

The following references are of record in the file of this patent:

UNITED STATES PATENTS

| Number | Name | Date |
| --- | --- | --- |
| 1,945,348 | Farr | Jan. 30, 1934 |
| 2,086,288 | Van Uum | July 6, 1937 |
| 2,094,200 | Ambridge | Sept. 28, 1937 |
| 2,115,098 | Engholm | Apr. 26, 1938 |
| 2,137,652 | Lundberg | Nov. 22, 1938 |
| 2,150,497 | Fernberg | Mar. 14, 1939 |
| 2,244,872 | Fergueson | June 10, 1941 |
| 2,282,996 | Dyresen | May 12, 1942 |
| 2,300,478 | Wiley | Nov. 3, 1942 |
| 2,319,112 | Christoph | May 11, 1943 |